US011944955B2

United States Patent
Quitete et al.

(10) Patent No.: US 11,944,955 B2
(45) Date of Patent: Apr. 2, 2024

(54) PROCESS OF OBTAINING A CATALYST, CATALYST AND PRE-TREATMENT PROCESS OF ACIDIC RAW MATERIALS

(71) Applicant: Petróleo Brasileiro S.A.—Petrobras, Rio de Janeiro (BR)

(72) Inventors: Cristina Pontes Bittencourt Quitete, Rio de Janeiro (BR); Vitor Loureiro Ximenes, Rio de Janeiro (BR); Marcio De Figueiredo Portilho, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 17/850,070

(22) Filed: Jun. 27, 2022

(65) Prior Publication Data

US 2022/0410126 A1 Dec. 29, 2022

(30) Foreign Application Priority Data

Jun. 25, 2021 (BR) ...................... 10 2021 012721 0

(51) Int. Cl.
*B01J 21/06* (2006.01)
*B01J 37/02* (2006.01)
(Continued)

(52) U.S. Cl.
CPC ......... *B01J 21/066* (2013.01); *B01J 37/0205* (2013.01); *B01J 37/03* (2013.01);
(Continued)

(58) Field of Classification Search
CPC ...... B01J 21/066; B01J 37/0205; B01J 37/03; B01J 37/04; B01J 37/08; B01J 37/20;
(Continued)

(56) References Cited

U.S. PATENT DOCUMENTS 4,698,186 A  10/1987  Jeromin et al.
6,147,196 A  11/2000  Stern et al.
(Continued)

FOREIGN PATENT DOCUMENTS

BR  102015031632 A2  6/2017
BR  102018009940 A2  11/2019
(Continued)

OTHER PUBLICATIONS

Justin W. Ntalikwa, "Solvent Extracion of Jatropha Oil for Biodiesel Production: Effects of Solvent-to-Solid Ratio, Particle Size, Type of Solvent, Extraction Time, and Temperature on Oil Yield." Journal of Renewable Energy, vol. 2021, pp. 1-8. (Year: 2021).*

(Continued)

*Primary Examiner* — Patricia L. Hailey
(74) *Attorney, Agent, or Firm* — Mintz, Levin, Cohn, Ferris, Glovsky and Popeo, P.C.

(57) ABSTRACT

The present invention concerns a catalyst and pre-treatment process for acidic charges consisting of sulfated zirconia and cerium for the production of biofuels, characterized in that the catalyst has greater activity and resistance to deactivation with acidic charges.

20 Claims, 3 Drawing Sheets

(51) Int. Cl.
    B01J 37/03     (2006.01)
    B01J 37/04     (2006.01)
    B01J 37/08     (2006.01)
    B01J 37/20     (2006.01)
    C10L 1/02      (2006.01)

(52) U.S. Cl.
    CPC .............. B01J 37/04 (2013.01); B01J 37/08 (2013.01); B01J 37/20 (2013.01); C10L 1/02 (2013.01); *B01J 2523/3712* (2013.01); *B01J 2523/47* (2013.01); *B01J 2523/48* (2013.01); *B01J 2523/62* (2013.01); *C10L 2200/0476* (2013.01); *C10L 2270/026* (2013.01); *C10L 2290/02* (2013.01); *C10L 2290/141* (2013.01)

(58) Field of Classification Search
    CPC ............ B01J 2523/3712; B01J 2523/47; B01J 2523/48; B01J 2523/62; C10L 1/02; C10L 2200/0476; C10L 2200/227; C10L 2200/026; C10L 2290/02; C10L 2290/141
    USPC ...................... 502/304, 349; 423/594.12, 598
    See application file for complete search history.

(56) References Cited

U.S. PATENT DOCUMENTS

| | | |
|---|---|---|
| 7,122,688 B2 | 10/2006 | Lin et al. |
| 7,256,301 B2 | 8/2007 | Erguen et al. |
| 8,163,946 B2 | 4/2012 | Yan et al. |
| 8,445,400 B2 | 5/2013 | Devi et al. |
| 8,704,003 B2 | 4/2014 | Essayem et al. |
| 9,062,081 B1 | 6/2015 | Cheng et al. |
| 2012/0283459 A1 | 11/2012 | Kim et al. |
| 2016/0121301 A1* | 5/2016 | Shingai .................. C01G 25/00 502/303 |

FOREIGN PATENT DOCUMENTS

| | | | | |
|---|---|---|---|---|
| CN | 105435769 A | * | 3/2016 | ............. B01D 53/56 |
| CN | 105688883 A | * | 6/2016 | ......... B01D 53/8628 |
| CN | 106902843 A | * | 6/2017 | .............. B01J 27/02 |
| CN | 109529802 A | * | 3/2019 | ......... B01D 53/9413 |
| JP | 2004043226 A | * | 2/2004 | ............. B01D 53/94 |
| WO | WO-9845212 A1 | * | 10/1998 | ........... B01D 53/945 |
| WO | 2004096962 A1 | | 11/2004 | |

OTHER PUBLICATIONS

Wahyudi Wahyudi et al., "Increasing of quality biodiesel of Jatropha seed oil with biodiesel mixture of waste cooking oil." Journal of Biotech Research 10, pp. 183-189. (Year: 2019).*
Banerjee et al. (2015) "Self-assembled Sulfated Zirconia Nanocrystals with Mesoscopic Void Space Synthesized via onic Liquid as a Porogen and Its Catalytic Activity for the Synthesis of Biodiesels", Applied Catalysis A: General, 502:380-387(29 pages).
Hu et al. (2013) "Acid-Catalysed Treatment of the Mallee Leaf Bio-oil with Methanol: Effects of Molecular Structure of Carboxylic Acids and Esters on their Conversion", Fuel Processing Technology, 106:569-576.
Liu et al. (2015) "Catalytically Upgrading Bio-oil via Esterification", Energy & Fuels, 29(6):3691-3698.
Lohitharn et al. (2009) "Upgrading of Bio-Oil: Effect of Light Aldehydes on Acetic Acid Removal via Esterification", Catalysis Communications, 11:96-99.
Lu et al. (2017) "Catalytic Upgrading of Bio-Oil by Simultaneous Esterification and Alkylation with Azeotropic Water Removal", Fuel Processing Technology, 161:193-198.
Milina et al. (2014) "Prospectives for Bio-oil Upgrading via Esterification Over Zeolite Catalysts", Catalysis Today, 235:176-183.
Prasertpong et al. (2020) "Optimization of Process Variables for Esterification of Bio-oil Model Compounds by a Heteropolyacid Catalyst", Energy Reports, 6:1-9.
Sondakh et al. (Oct. 2018) "Esterification Bio-oil using Acid Catalyst and Ethanol", International Journal of Engineering and Management Research, 8(5):137-141.

* cited by examiner

PROCESS OF OBTAINING A CATALYST, CATALYST AND PRE-TREATMENT PROCESS OF ACIDIC RAW MATERIALS

CROSS-REFERENCE TO RELATED APPLICATION

This application claims priority to Brazilian Application No. 10 2021 012721 0, filed on Jun. 25, 2021, and entitled "PROCESS OF OBTAINING A CATALYST, CATALYST AND PRE-TREATMENT PROCESS OF ACIDIC CHARGES," the disclosure of which is incorporated herein by reference in its entirety.

FIELD OF THE INVENTION

The present invention relates to a catalyst and process for pre-treatment of acidic raw materials consisting of sulfated zirconia and cerium for the production of biofuels, characterized by the catalyst having greater activity and resistance to deactivation with acidic raw materials.

DESCRIPTION OF THE STATE OF THE ART

In the research for low carbon footprint fuels and bio-products, and also in the production of biodiesel and biolubricants, the esterification reaction plays an important role. For example, the production of biodiesel by esterification involves the reaction of fatty acids with alcohols, such as methanol and ethanol. The esterification reaction can also be used in the pre-treatment of bio-oil, where the acidity of this raw material is reduced. Bio-oil is a raw material for renewable fuels obtained by means of pyrolysis processes in the absence of oxygen.

However, the esterification reaction requires that the heterogeneous catalyst has adequate properties, such as acidity, porosity and hydrophobicity. The formulation of esterification catalysts for acidic raw materials, such as fatty acids and bio-oil, must necessarily have greater catalytic activity, in addition to high reaction stability, using smaller amounts of alcohol in the reaction. Leaching in a liquid medium is recognized as one of the main causes of deactivation of catalysts in these processes of reducing acidity of acidic raw materials, which may be caused by the presence of alcohols and other compounds present in the reaction medium. The deactivation process is also due to the presence of unconverted products and reactants in the catalyst pores, which is favored under low conversion conditions and facilitated by the existence of small pores.

There is a great effort being applied in the development of heterogeneous acidic catalysts, since esterification reactions require catalysts with adequate properties. One of the great difficulties encountered is that the catalysts can quickly deactivate under the reaction conditions employed, in addition to having low activity. This is a critical point of acidic solids, since most of the preparations lead to the loss of the functional group and, consequently, of its catalytic activity.

The esterification processes aimed at the production of biodiesel that use fatty acids employ high pressures and temperatures, as reported in U.S. Pat. No. 7,256,301 (2 to 100 bar (0.2 to 10 MPa), 50 to 300° C.), U.S. Pat. No. 6,147,196 (40 to 100 bar (4 to 10 MPa), 220 to 250° C.) and U.S. Pat. No. 8,704,003 (10 to 75 bar (1 to 7.5 MPa), 150 to 250° C.). Another aggravating factor is the fact that high temperatures and pressures cause the formation of undesirable by-products, such as dimethyl ether and compounds derived from the cracking of the raw material. The methanol/raw material molar ratio (R) should also be minimized, as it leads to a reduction in the operational costs of recovering this reagent. Therefore, active catalysts capable of carrying out this process under milder conditions are desirable.

The low activity of some inorganic oxides, the limitation of access to the active sites of the zeolites, which are naturally microporous, due to the triglyceride molecules being very bulky, the deactivation of some catalysts in successive cycles and the leaching of catalyst compounds based on anchored metallic complexes are some of the problems faced. Commonly used catalysts contain Ti, Zn, Sn in the form of aluminates and silicates (U.S. Pat. No. 6,147,196), commercial ion exchange resins (U.S. Pat. No. 4,698,186), binary oxides of La and Zn(U.S. Pat. No. 8,163,946), functionalized silicate-based solids (U.S. Pat. Nos. 7,122,688 and 9,062,081), sulfonated carbons obtained from glucose (U.S. Pat. No. 8,445,400), tungsten-doped and sulfated zirconia (WO2004096962 A1) and binary oxides (e.g., Zn, Ce, La, Si, Ti, Nd) supported on oxide of zirconia (U520120283459 A1). The class of superacidic solids is the most promising; however, catalysts often deactivate easily due to the loss of acidic groups, as in the case of sulfonated carbons and sulfated oxides.

The pre-treatment of bio-oil, also considered an option for the use of heterogeneous solid acidic catalysts, would provide improvement in chemical stability, reduction of acidity and water content, enabling the production of renewable fuels from this input. Esterification, transesterification and acetalization reactions with alcohols decrease the content of carboxylic acids, ketones and aldehydes, transforming them into esters and acetals (Hu et al, *Fuel Processing Technology* 106: 569-576, 2013; Lu, J., Guo, S., Fu, Y., Chang, J., *Fuel Processing Technology* 161: 193-198, 2017). A limiting factor is the low esterification temperature, preventing the favoring of parallel reactions, requiring a catalyst with high reaction activity.

The catalysts used are mostly acids, such as acidic resins, zeolites, SBA-15-SO3H, and others, generally, superacids (Milina, M., Mitchell, S., Pérez-Ramiréz, J., *Catalysis Today* 235: 176-183, 2014; Lohitharn, N., Shanks, B. H., *Catalysis Communications* 11: 96-99, 2009; Prasertpong, P., Jaroenkhasemmeesuk, C., Regalbuto, J., Lipp, J., Tippayawong, N., *Energy Reports* 6: 1-9, 2020). Liu et al. esterified the crude bio-oil with ethanol (mass ratio=2:1), and 2% m/m $SO_4^{-2}$ 50% $ZrO_2/TiO_2$ (in relation to the total mixture), 80° C., in a Parr reactor with stirring of 300 rpm. Sondakh et al. (2018), in turn, performed the esterification reaction using homogeneous catalysis, with $H_2SO_4$, HCl and citric acid. It is observed that the use of catalysts with higher acidity, such as $H_2SO_4$ and HZSM-5, would promote undesirable parallel reactions, with the formation of ethers as by-products (LIU, Y., Li, Z, LEAHY, J. J., KWAÌNSKE, W., *Energy Fuels* 29: 3691-3698, 2012).

The choice of the catalyst involves adequate acidity (Bronsted acidic sites), and adequate porosity, with the presence of macropores or a wide distribution of pores, since the catalysts can be deactivated; both by the formation of water and by the retention of the products in the pores. Note that the acidity of the bio-oil or other acidic raw material can interfere with the integrity of the catalyst, as, for example, dealuminization of zeolites can occur, or a decrease in Bronsted acidic sites, leading to the loss of catalytic activity (Milina M., Mitchell, S., Pérez-Ramiréz, J., *Catalysis Today* 235: 176-183, 2014).

Document BR 10 2015 031632-1 discloses a process for obtaining biodiesel from raw materials with fatty acids and triglycerides with sulfated zirconia catalysts with bifunctional activity (esterification and transesterification). Document BR 10 2018 009940-0 teaches the preparation of suitable catalysts for the production of biodiesel from alternative sources (oils and fats with higher levels of free fatty acids and of lower market value), being active for the esterification and transesterification reactions, as well as its obtaining process and a process that uses such catalysts for the production of biodiesel. The catalyst formulations are zirconia-titania sulfated and optionally modified with cerium. Similar to BR 10 2015 031632-1, the catalysts are also bifunctional. Document BR 10 2018 009940-0 is also characterized by using 1 to 4 reaction stages.

The paper of Banerjee et al. studied a sulfated zirconia-based nanocrystalline catalyst formulation with an ionic liquid as a porogen for the esterification of fatty acids with methanol (Banerjee, B.; Bhunia, S.; Bhaumik, A. *Applied Catalysis A*: General 502: 380-387, 2015).

In view of the disclosure, solid acidic catalysts are needed for processes of acidity reduction of acidic raw materials via esterification that have activity at low temperatures, and that do not leach in the reaction medium; this can be achieved with optimized formulations with large pores, low sulfur or sulfate content. The use of large amounts of sulfate to provide acidity to the catalyst can cause operational problems, such as corrosion from sulfate leaching, in addition to loss of catalyst activity over time.

BRIEF DESCRIPTION OF THE INVENTION

The solution taught by the present invention allows obtaining heterogeneous catalysts with a greater amount of macropores and greater acidity, allowing greater activity and resistance to deactivation, therefore more active for reducing acidity in acidic raw materials such as fatty acids, mixtures of fatty acids with triglycerides and bio-oil. The prepared catalyst consists of zirconia sulfated with cerium, where simple and low-cost porogens are used in its production process, which lead to unexpected technical effects: greater quantity of macropores and greater acidity, making it an efficient catalyst for the reduction of acidity of acidic raw materials. The porogen enlarges the pores of the catalyst during the calcination step and decomposes entirely.

An advantage of the developed solid acidic catalyst is the possibility of carrying out the esterification reaction in relatively mild conditions when compared to homogeneous acidic catalysis, increasing the economicity of the process and minimizing the formation of by-products.

BRIEF DESCRIPTION OF DRAWINGS

The present invention will be described in more detail below, with reference to the attached figures which, in a schematic form and not limiting the inventive scope, represent examples thereof. In the drawings, there are.

DETAILED DESCRIPTION OF THE INVENTION

Figure 1:
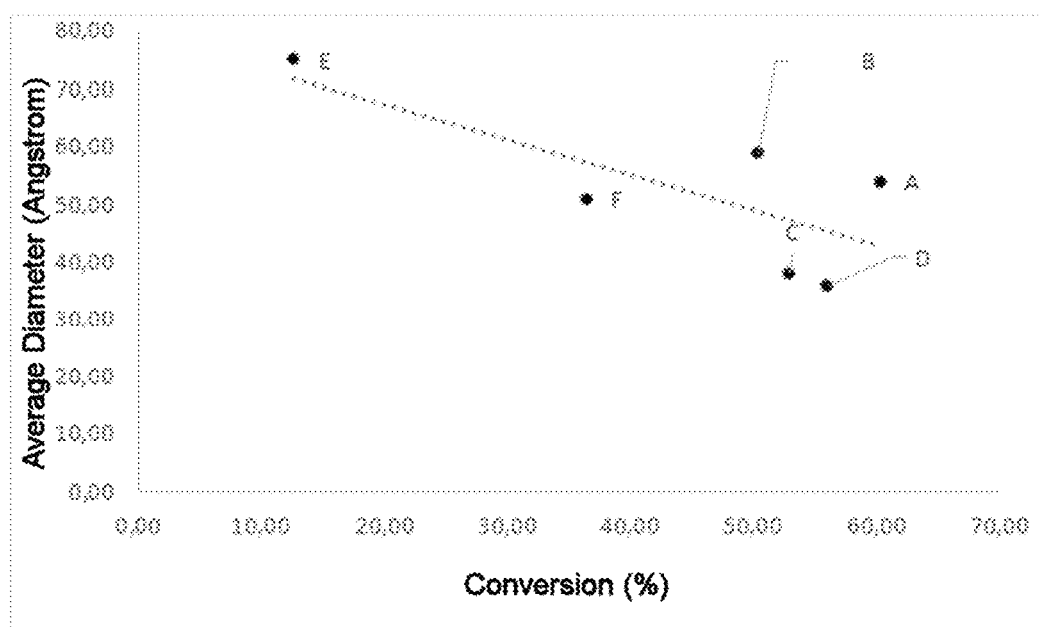
FIG. 1 shows a graph of the average diameter of the catalyst versus the conversion (60° C./R=10/180 min, using a standard raw material of 85% oleic acid+15% soybean oil), where 1 and 2 are the reference catalysts 1 and 2, respectively, and the catalysts obtained with porogens (an agent that increases porosity, by means of the removal by calcination, or extraction) are represented by the letters A to E, whose preparation is shown in the examples 1 to 3.

Preliminarily, it is noted that the description that follows will start from preferred embodiments of the invention. As will be apparent to any technician skilled on the subject, however, the invention is not limited to these particular embodiments, but only to the scope of protection defined in the claims.

The catalyst of the present invention is obtained by introducing the active phases of cerium, or titanium and sulfur in the zirconium-based catalyst, which can be introduced separately or simultaneously.

Thus, according to an embodiment of the invention, the process for obtaining the catalysts according to the present invention comprises the following steps:
  a) precipitation of zirconium hydroxide using a source of zirconium and a base;
  b) addition of a porogen to the solution prepared in a);
  c) stirring, aging, filtering, drying;
  d) addition of a source of cerium and a source of sulfur over the dry material obtained in c);
  e) calcination of the material obtained in d);
  f) optionally, the addition of the porogen is carried out during the step of sulfation and cerium incorporation in d), followed by calcination;
  g) optionally, addition of a source of titanium and sulfur followed by the addition of cerium in step d).

The source of zirconium can be zirconium oxychloride or zirconium nitrate, and the base can be ammonium hydroxide, or sodium carbonate, or sodium hydroxide. The source of cerium may be cerium nitrate. The source of sulfur can be ammonium sulfate. In this way, a low sulfur zirconium/cerium catalyst is obtained. The deposition takes place by a method selected from wet spot impregnation, mud impregnation or chemical vapor phase deposition, preferably by mud impregnation. Aging is carried out at a pH in the range between 8 and 11, for a period of time of up to 24 hours, and dried at a temperature between 100 and 140° C., for a period of between 10 and 24 hours. The calcination step takes place at a temperature between 350° C. and 800° C., for a period between 2 h and 10 h, using a heating rate between 1° C./min and 10° C./min.

The catalysts thus obtained have a Ce/Zr mass ratio: 0.02 to 0.10; Ti/Zr=0.05 to 0.50; and sulfur content in the range of 1.0 to 5.0% m/m.

EXAMPLES

Next, in order that the invention can be better understood, experiments that illustrate the invention are presented, without, however, being considered limiting.

Example 1

A: in the first step, the precipitation of zirconium hydroxide was made using Zr oxychloride (1 M) and NH$_4$OH (14.5% m/m), at room temperature, pH in the range of 10 to 11, dripping the precursor of Zr under ammonium hydroxide for 60 minutes. After the addition of the precursor, corn starch was preferably incorporated, and the porogen may originate from other sources such as: potato, yam, arrowroot, banana, among others (35% m/m in relation to the desired amount of $ZrO_2$); the sample remained for 1 hour under stirring, followed by aging for 22 hours, washing/filtering and drying at 100° C. for 16 hours.

With the dry material, the impregnation was made with cerium nitrate and ammonium sulfate (Ce/Zr=0.05 and 6.5% m/m of ammonium sulfate in relation to the $ZrO_2$) simultaneously in zirconium hydroxide (mass ratio $H_2O:Zr(OH)_x$:2.4:1). The mud was stirred for 24 hours at 300 rpm. After this step, the sample was dried at 100° C. for 24 hours in a fluidized bed reactor with air flow, followed by calcination at 600° C. for 5 h using 3° C./min using air flow rate (40 $cm^3$/min).

B: in this preparation, the porogen incorporation was made during the sulfation/incorporation of cerium in zirconium hydroxide prepared previously by precipitation (6.5% m/m ammonium sulfate, Ce/Zr=0.05, mass ratio $H_2O:Zr(OH)_x$:2.4:1, and 42% m/m corn starch in relation to $ZrO_2$). Note that starch can come from other sources such as: potato, yam, arrowroot, banana, among others. The step was carried out at 25° C. for 24 hours at 300 rpm. After this step, the sample was dried at 100° C. for 24 hours in a fluidized bed reactor with air flow, followed by calcination at 600° C. for 5 h, using 3° C./min, using air flow rate (40 $cm^3$/min).

C: In the first step, the precipitation of zirconium hydroxide was made using Zr oxychloride (1 M) and $NH_4OH$ (14.5% m/m), pH in the range of 10 to 11, at room temperature. After the addition of the precursor, corn starch was incorporated (17.5% m/m in relation to the desired amount of $ZrO_2$), the sample remained for 1 hour under stirring, followed by aging for 22 hours, washing/filtering and drying at 100° C. for 16 hours.

With the dry material, the impregnation was made with cerium nitrate and ammonium sulfate (Ce/Zr=0.05 and 6.5% m/m of ammonium sulfate in relation to $ZrO_2$) simultaneously in zirconium hydroxide (mass ratio $H_2O:Zr(OH)_x$:2.4:1). The mud was stirred for 24 hours at 300 rpm. After this step, the sample was dried at 100° C. for 24 hours in a fluidized bed reactor with air flow, followed by calcination at 600° C. for 5 h using 3° C./min using air flow rate (40 $cm^3$/min).

Example 2

This example illustrates the catalyst preparation using an EO-PPO-PEO triblock copolymer (poly(ethylene glycol)-poly(propylene glycol)-poly(ethylene glycol) copolymer) with ratio 20:70:20) with 20:70:20 (EO:PO:EO), as a porogen.

D: In the first step, the precipitation of zirconium hydroxide was made using Zr oxychloride (1 M) and $NH_4OH$ (14.5% m/m), pH in the range of 10 to 11, at room temperature, dripping the precursor of Zr under ammonium hydroxide for 60 minutes. After the addition of the precursor, the EO-PPO-PEO triblock copolymer (35% m/m in relation to the desired amount of $ZrO_2$) was incorporated, the sample remained for 1 hour under stirring, followed by aging for 22 hours, washing/filtration and drying at 100° C. for 16 hours.

With the dry material, the impregnation was made with cerium nitrate and ammonium sulfate (Ce/Zr=0.05 and 6.5% m/m of ammonium sulfate in relation to $ZrO_2$) simultaneously in zirconium hydroxide (mass ratio $H_2O:Zr(OH)_x$:2.4:1). The mud was stirred for 24 hours at 300 rpm. After this step, the sample was dried at 100° C. for 24 hours in a fluidized bed reactor with air flow, followed by calcination at 600° C. for 5 h using 3° C./min using air flow rate (40 $cm^3$/min).

E: Zirconium hydroxide was obtained by precipitation with ammonium hydroxide, at room temperature and at controlled pH (9 to 10) by dripping zirconium oxychloride (1.5 M) for 40 minutes over the solution of ammonium hydroxide (14.5% m/m). At the end of the precursor addition, EO-PPO-PEO triblock copolymer (6.7% m/m in relation to $ZrO_2$) was added, the system aged at room temperature for 21 hours, being filtered and washed with deionized water, and then dried in a static atmosphere at 120° C. for 16 hours.

With the dry material, the sulfation was made with titanium oxysulfate and ammonium sulfate (Ti/Zr=0.18 and 6.5% m/m of ammonium sulfate in relation to $ZrO_2$), with mass ratio $H_2O:Zr(OH)_x$:2.4:1. The mud was stirred for 24 hours at 300 rpm. After this step, the sample was calcined at 600° C. for 5 h using 3° C./min using air flow rate (40 $cm^3$/min). After this step, the solid was impregnated with cerium nitrate (Ce/Zr=0.035) in excess of solution, for 2 hours at room temperature with stirring. The solid was dried at 40° C. for 16 h and calcined with air flow 40 $cm^3$/min at 400° C. for 4 hours, using a rate of 3° C./min.

Example 3

This example illustrates the preparation of catalysts without the use of a porogen.

Reference 1 (1)

Zirconium hydroxide was obtained by precipitation with ammonium hydroxide, at room temperature and at controlled pH (9 to 10) by dripping zirconium oxychloride (1.5 M) for 40 minutes over the solution of ammonium hydroxide (14.5% m/m). The system was aged at room temperature for 21 hours, being filtered and washed with deionized water, and then dried in a static atmosphere at 120° C. for 16 hours.

With the dry material, the sulfation was made with ammonium sulfate (6.5% m/m of ammonium sulfate in relation to $ZrO_2$), with a mass ratio $H_2O:Zr(OH)_x$:2.4:1. The mud was stirred for 24 hours at 300 rpm. After this step, the sample was calcined at 600° C. for 5 h using 3° C./min using air flow rate (40 $cm^3$/min). After this step, the solid was impregnated with cerium nitrate (Ce/Zr=0.05) in excess of solution, for 2 hours at room temperature with stirring. The solid was dried at 40° C. for 16 h and calcined with an air flow of 40 $cm^3$/min at 400° C. for 4 hours, using a rate of 3° C./min.

Example 4

This example illustrates the preparation of catalysts without the use of a porogen.

Reference 2 (2)

Zirconium hydroxide was obtained by precipitation with ammonium hydroxide, at room temperature and at controlled pH (9 to 10) by dripping zirconium oxychloride (1.5 M) for 40 minutes over the solution of ammonium hydroxide (14.5% m/m). The system was aged at room temperature for 21 hours, being filtered and washed with deionized water, and later dried in a static atmosphere at 120° C. for 16 hours.

With the dry material, sulfation was performed with titanium oxysulfate and ammonium sulfate (Ti/Zr=0.18 and 6.5% m/m of ammonium sulfate in relation to $ZrO_2$), with mass ratio $H_2O:Zr(OH)_x$:2.4:1. The mud was stirred for 24 hours at 300 rpm. After this step, the sample was calcined at 600° C. for 5 h using 3° C./min using air flow (40 cm³/min). After this step, the solid was impregnated with cerium nitrate (Ce/Zr=0.035) in excess of solution, for 2 hours at room temperature with stirring. The solid was dried at 40° C. for 16 h and calcined with an air flow of 40 cm³/min at 400° C. for 4 hours, using a rate of 3° C./min.

Example 5

This example illustrates the characterization results and reaction tests.

Table 1 shows that the changes in the preparation of catalysts A to E provided an increase in acidic properties in relation to the catalyst Reference 1 (1). The results can be analyzed as follows:
a) density of acidic sites (Bronsted acidity/surface area ratio); the order was as follows: E>A>D>C>B>Reference 2>Reference 1 (1).
b) acidic strength had the following order: D>C>Reference 2>A>E>B>Reference 1 (1). It can be evaluated by the ratio of moles of ammonia/gcat by moles of propene/gcat obtained in the n-propylamine TPD assay.

Table 2 presents the textural results of the series of catalysts studied, showing the increase of macropores in the samples with the use of porogens.

TABLE 1

Acidity results

| | n-propylamine TPD | |
|---|---|---|
| Catalysts | Density of acidic sites (μmol $NH_3/m^2$) | Acidic strength (($μmol_{NH3/gcat}$)/ ($μmol_{C3H6/gcat}$)) |
| Reference 1 (1) | 0.95 | 0.71 |
| A | 1.39 | 1.35 |
| B | 1.03 | 1.10 |
| C | 1.35 | 1.42 |
| Reference 2 (2) | 0.99 | 1.36 |
| D | 1.37 | 1.59 |
| E | 1.77 | 1.11 |

Note:
TPD—temperature programmed desorption.

TABLE 2

Results of textural characterization.

| Catalyst | $A_{BET}$ (m²/g) | $D_{pore}$ *(Å) | Porosity Type |
|---|---|---|---|
| Reference 1 (1) | 100 | 75 | Mesoporous |
| A | 115 | 54 | Mesopores and evidence of the presence of macropores |
| B | 86 | 59 | Predominantly mesoporous |
| C | 96 | 38 | Mesopores and evidence of the presence of macropores |
| D | 102 | 36 | Mesoporous, with presence of micropores and macropores |
| E | 83 | 49 | Mesoporous with a predominance of macropores |
| Reference 2 (2) | 144 | 51 | Mesoporous |

Note:
*Referring to the BJH desorption curve.

FIG. 1 shows the test results in the selected condition: 60° C./R=10/180 min, using a standard raw material of 85% oleic acid+15% soybean oil, where R=molar ratio between raw material and methanol, considering the fatty chain that can be esterified into the glyceride. All catalysts showed conversions above the blank conversion (in the absence of catalyst) equal to 11%. It is observed that despite the Reference 1 catalyst having a larger pore diameter, the conversion found was extremely low, being related to the low acidity of the sample (lower acidic strength and density of Bronsted acidic sites). The reactions can be carried out in continuous processes, or in batch, or in fed batch. The reactions are preferably carried out in a continuous process in a plug-type fixed bed flow reactor ("PFR—plug flow reactor"). The process is carried out at temperatures from 50 to 120° C. for bio-oil raw material and 50 to 150° C. for fatty acid raw material, pressures from 1 to 25 bar (0.1 to 2.5 MPa), reaction time from 2 to 6 hours, alcohol/fatty acid molar ratio between 2 and 10, alcohol/bio-oil molar ratio between 2 and 8, and percentage of catalyst in relation to acidic raw material from 1 to 8% m/m.

Additionally, all samples from A to D had higher conversions than the reference catalysts, even D and C, which had smaller average diameters than the reference catalysts, as can be seen in FIG. 1.

Figure 2:
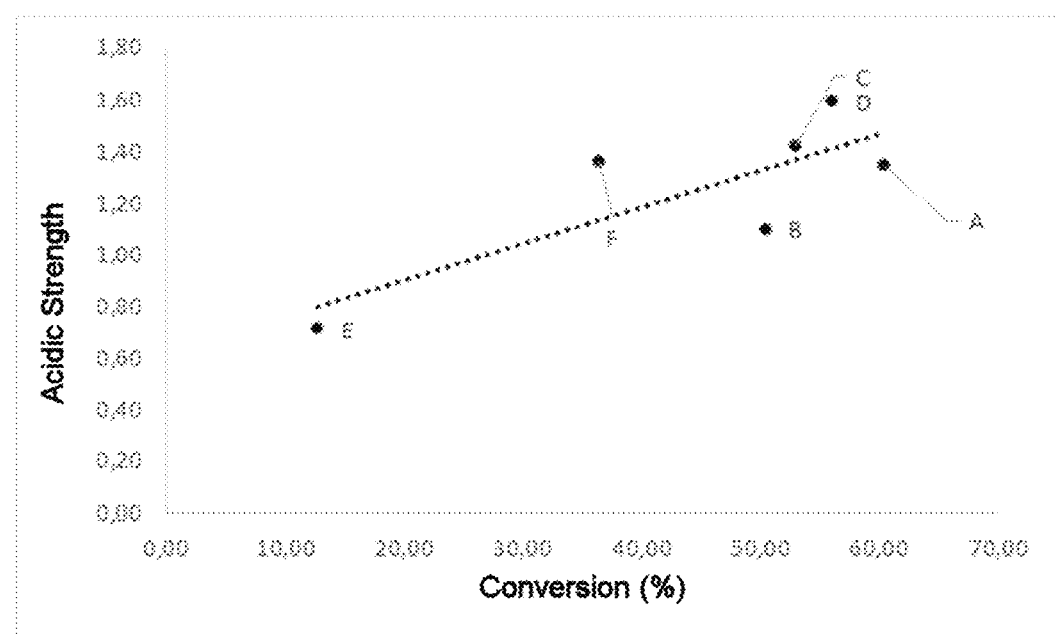
FIG. 2 shows acidic strength versus the conversion (60° C./R=10/180 min, using a standard raw material of 85% oleic acid+15% soybean oil), where 1 and 2 are the reference catalysts 1 and 2, respectively, and the catalysts obtained with porogens are represented by the letters A to E, whose preparation is shown in examples 1 to 3.
Figure 3:
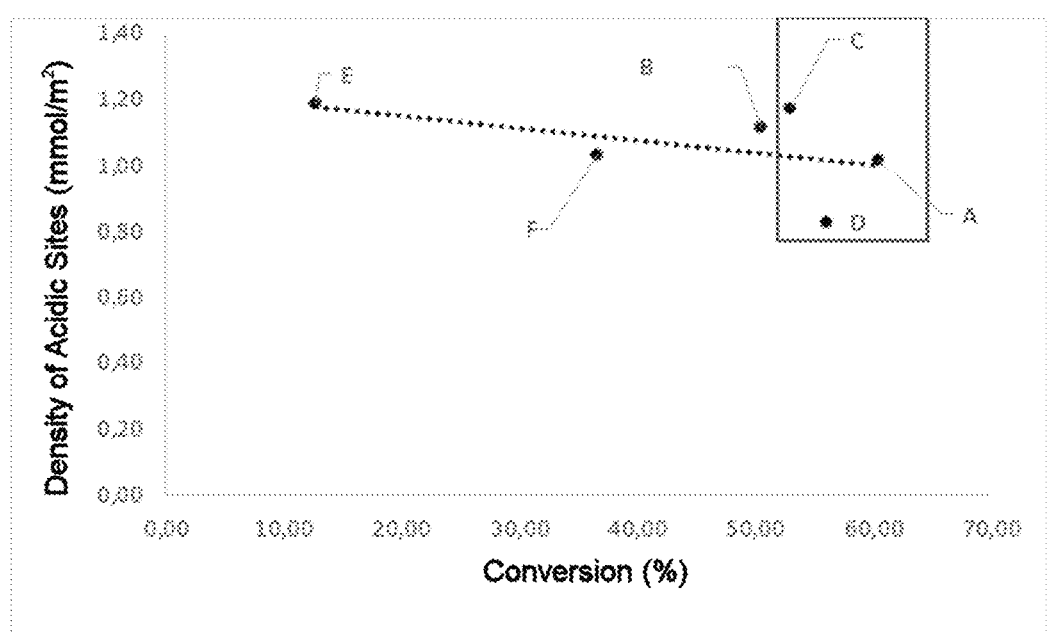
FIG. 3 shows the density of acidic sites versus the conversion (60° C./R=10/180 min, using a standard raw material of 85% oleic acid+15% soybean oil), where 1 and 2 are the reference catalysts 1 and 2, respectively, and the catalysts obtained with porogens are represented by the letters A to E, whose preparation is shown in examples 1 to 3.

FIGS. 2 to 3 show that the results are directly correlated with acidic properties (Bronsted acidity and acidic strength). The catalysts with the presence of macropores, A, D and C, have the highest conversion results, showing that the procedure was able to produce more active catalysts with the use of porogens in relation to Reference catalysts 1 and 2, as can be seen in Table 2. It is considered that the best result found was obtained for sample C, since it has high activity, with the presence of macropores and high density of acidic sites. In addition, the preparation took less starch in its formulation.

The percentage of the catalyst in relation to the acidic raw material is from 1 to 8% m/m, both for fatty acids or mixtures of fatty acids with triglycerides and for bio-oil raw material.

Therefore, the catalyst can be used in the pre-treatment of acidic raw materials such as fatty acids, mixtures of fatty acids with triglycerides and bio-oil. The mixtures of fatty acids with triglycerides have contents of 0.05 to 99.5% m/m of fatty acid in the mixture. The alcohols used in this process are low molecular weight aliphatic alcohols, ranging from 1 to 4 carbon atoms, preferably methanol and ethanol.

The catalyst can also be used with bio-oil, which comes from pyrolysis processes in the absence of oxygen, at temperatures from 400 to 600° C. Bio-oil comes from plant biomass, such as sugarcane bagasse, sugarcane straw, wood, rice husk, waste from the paper industry such as black liquor, etc.

Note that the esterification reaction occurs naturally during the aging of bio-oil. Esterification, transesterification and acetalization reactions with alcohols decrease the content of carboxylic acids, ketones and aldehydes, transforming them into esters and acetals (Lu, J., Guo, S., Fu, Y., Chang, J., *Fuel Processing Technology* 161: 193-198, 2017). These reactions can occur, to some extent, promoted by acidity and storage temperature, and can even happen at room temperature (Diebold, J.P., NREL/SR-570-27613). Controlled esterification can be used in a pre-treatment of bio-oil, allowing the partial removal of oxygenated compounds, increasing the useful life of HDO catalysts, consequently reducing the severity of the reaction, enabling the use of renewable raw materials in refining.

The invention claimed is:

1. A method of obtaining a pre-treatment catalyst of acidic raw materials, the method comprising:
   precipitating zirconium hydroxide using a source of zirconium and a base to form a solution;
   adding a porogen to the solution;
   stirring, aging, filtering, and drying the solution to produce a dry material;
   adding a source of cerium and a source of sulfur over the dry material to produce a material mixture;
   calcinating the material mixture;
   optionally, wherein adding the porogen occurs while adding the source of cerium and the source of sulfur, prior to calcinating the material mixture; and
   optionally, wherein the method further comprises adding a source of titanium in the form of titanium oxysulfate when adding the source of sulfur, and the source of cerium prior to calcinating the material mixture.

2. The method of obtaining a pre-treatment catalyst of acidic raw materials according to claim 1, wherein the porogen is starch or a surfactant.

3. The method of obtaining a pre-treatment catalyst of acidic raw materials according to claim 2, wherein the porogen is a surfactant, wherein the surfactant comprises a copolymer of poly(ethylene glycol)-poly(propylene glycol)-poly(ethylene glycol) with a ratio of 20:70:20.

4. The method of obtaining a pre-treatment catalyst of acidic raw materials according to claim 1, wherein the source of zirconium is zirconium oxychloride or zirconium nitrate.

5. The method of obtaining a pre-treatment catalyst of acidic raw materials according to claim 1, wherein the base is selected from ammonium hydroxide, or sodium carbonate, or sodium hydroxide.

6. The method of obtaining a pre-treatment catalyst of acidic raw materials according to claim 1, wherein the source of cerium is cerium nitrate.

7. The method of obtaining a pre-treatment catalyst of acidic raw materials according to claim 1, wherein the source of sulfur is ammonium sulfate.

8. The method of obtaining a pre-treatment catalyst of acidic raw materials according to claim 1, wherein the aging is carried out in pH ranging between 8 and 11, for a period of time of up to 24 hours, and dried at a temperature between 100 and 140° C., for a period between 10 and 24 hours.

9. The method of obtaining a pre-treatment catalyst of acidic raw materials according to claim 1, wherein calcinating the material mixture occurs at a temperature of 350° C. to 800° C., for a period of time between 3 h and 10 h, using a heating rate between 1° C./min and 10° C./min.

10. A method of obtaining a pre-treatment catalyst of acidic raw materials, the method comprising:
    precipitating zirconium hydroxide using a source of zirconium and a base to form a solution;
    adding a porogen to the solution;
    stirring, aging, filtering, and drying the solution to produce a dry material;
    adding a source of cerium and a source of sulfur over the dry material to produce a material mixture, wherein adding the source of cerium and the source of sulfur is carried out by a method selected from wet spot impregnation, mud impregnation or chemical vapor phase deposition, and
    calcinating the material mixture;
    optionally, wherein adding the porogen occurs while adding the source of cerium and the source of sulfur prior to calcinating the material mixture; and
    optionally, wherein the method further comprises adding a source of titanium in the form of titanium oxysulfate when adding the source of sulfur and the source of cerium prior to calcinating the material mixture.

11. The method of obtaining a pre-treatment catalyst of acidic raw materials according to claim 10, wherein adding the source of cerium and the source of sulfur is carried out by mud impregnation.

12. A pre-treatment catalyst of acidic raw materials, wherein the pre-treatment catalyst comprises a solid acidic catalyst of sulfated zirconia/cerium or sulfated zirconia/cerium/titanium, with mass ratio Ce/Zr from 0.2 to 0.10 or Ti/Zr of 0.05 to 0.50, specific area of between 70 and 120 $m^2/g$, pore diameter between 40 and 80 Å, acidic strength between 0.9 and 1.5 (($\mu$mol $NH_3$/gcat)/($\mu$mol $C_3H_6$/gcat)), acidic site density between 0.7 to 2.0 ($\mu$mol $NH_3/m^2$), sulfur content between 1.0 to 5.0% m/m, and obtained in the method as defined in claim 1.

13. A pre-treatment method of acidic raw materials, wherein the method uses the solid acidic catalyst as defined in claim 12, and in that the method is used in esterification reactions with fatty acids, mixtures of fatty acids and triglycerides, a mixture of alcohol and fatty acids, a mixture of alcohol and bio-oil, or bio-oil, in batch, in fed batch, or in continuous mode, in a fixed bed reactor.

14. The pre-treatment method of acidic raw materials as defined in claim 13, wherein the method uses aliphatic alcohols of low molecular weight, in the range of ranging between 1 to 4 carbon atoms.

15. The pre-treatment method of acidic raw materials as defined in claim 14, wherein the aliphatic alcohols of low molecular weight comprise methanol or ethanol.

16. The process pre-treatment method of acidic raw materials as defined in claim 13, wherein the fatty acid is present in the mixture of fatty acid and triglycerides in a concentration between 0.05 to 99.5% m/m.

17. The pre-treatment method of acidic raw materials as defined in claim 13, wherein the bio-oil comes from processes of pyrolysis of plant biomass in the absence of oxygen, with temperatures between 400 and 550° C.

18. The pre-treatment method of acidic raw materials as defined in claim 13, wherein it is carried out at temperatures from 50 to 120° C. for bio-oil raw material and 50 to 150° C. for fatty acid raw material, pressures from 1 to 25 bar (0.1 to 2.5 MPa), reaction time from 2 to 6 hours, alcohol/fatty acid molar ratio between 2 and 10, alcohol/bio-oil molar ratio between 2 and 8, and percentage of catalyst in relation to raw materials from 1 to 8% m/m.

19. A pre-treatment catalyst of acidic raw materials, wherein the pre-treatment catalyst comprises a solid acidic catalyst of sulfated zirconia/cerium or sulfated zirconia/cerium/titanium, with mass ratio Ce/Zr from 0.2 to 0.10 or Ti/Zr of 0.05 to 0.50, specific area of between 70 and 120 $m^2/g$, pore diameter between 40 and 80 Å, acidic strength between 0.9 and 1.5 (($\mu$mol $NH_3$/gcat)/($\mu$mol $C_3H_6$/gcat)), acidic site density between 0.7 to 2.0 (μmol $NH_3/m^2$), sulfur content between 1.0 to 5.0% m/m, and is obtained in the method as defined in claim 1, wherein the solid acidic catalyst is used in esterification reactions with fatty acids, mixtures of fatty acids and triglycerides, a mixture of alcohol and fatty acids, a mixture of alcohol and bio-oil, or bio-oil, in batch, in fed batch, or in continuous mode, in a fixed bed reactor, wherein the fatty acid is present in the mixture of fatty acid and triglycerides in a concentration between 0.05 to 99.5% m/m.

20. A pre-treatment catalyst of acidic raw materials, wherein the pre-treatment catalyst comprises a solid acidic catalyst of sulfated zirconia/cerium or sulfated zirconia/cerium/titanium, with mass ratio Ce/Zr from 0.2 to 0.10 or Ti/Zr of 0.05 to 0.50, specific area of between 70 and 120 $m^2/g$, pore diameter between 40 and 80 Å, acidic strength between 0.9 and 1.5 ((μmol $NH_3$/gcat)/(μmol $C_3H_6$/gcat)), acidic site density between 0.7 to 2.0 (μmol $NH_3/m^2$), sulfur content between 1.0 to 5.0% m/m, and is obtained in the method as defined in claim 1, wherein the solid acidic catalyst is used in esterification reactions with fatty acids, mixtures of fatty acids and triglycerides, a mixture of alcohol and fatty acids, a mixture of alcohol and bio-oil, or bio-oil, in batch, in fed batch, or in continuous mode, in a fixed bed reactor, wherein the bio-oil comes from processes of pyrolysis of plant biomass in the absence of oxygen, with temperatures between 400 and 550° C.

\* \* \* \* \*